United States Patent [19]

Tice

[11] Patent Number: 5,603,507
[45] Date of Patent: Feb. 18, 1997

[54] METHOD OF INPUT SELECTION IN AN ELECTRONIC GAME SYSTEM

[75] Inventor: Steve E. Tice, Sherman Oaks, Calif.

[73] Assignee: Hasbro, Inc., Pawtucket, R.I.

[21] Appl. No.: 231,271

[22] Filed: Apr. 22, 1994

[51] Int. Cl.$^6$ .......................................................... A63F 9/22
[52] U.S. Cl. ................................................. 463/29; 463/32
[58] Field of Search .................................... 273/433, 434, 273/437, 85 G, DIG. 28; 434/307 R; 345/7, 8

[56] References Cited

U.S. PATENT DOCUMENTS

| | | | |
|---|---|---|---|
| 4,310,849 | 1/1982 | Glass | 350/96.15 |
| 4,445,187 | 4/1984 | Best | 273/434 |
| 4,695,953 | 9/1987 | Blair et al. | 273/85 G |
| 4,922,420 | 5/1990 | Nakagawa et al. | 273/148 B |
| 5,114,157 | 5/1992 | Kita | 273/434 |
| 5,130,794 | 7/1992 | Ritchey | 358/87 |
| 5,177,872 | 1/1993 | Lewis et al. | 33/366 |
| 5,322,441 | 6/1994 | Lewis et al. | 434/307 R |
| 5,358,259 | 10/1994 | Best | 273/434 |

*Primary Examiner*—Angela D. Sykes
*Assistant Examiner*—Eric F. Winakur
*Attorney, Agent, or Firm*—Hughes Hubbard & Reed

[57] ABSTRACT

A method for providing for user selections in an electronic game system through the use of a metaphor of portals suspended before the user, each depicting a representative animated scene, which the user may select and appear to pass through in the process of making the desired selection. Where more selections are available than can be displayed at one time, means are provided to change the current range of selections being displayed. One of the displayed portals is designated at any time as the one that will be chosen when the user activates the input means for making a selection. A preferred embodiment in an immersive virtual reality game system is described.

13 Claims, 4 Drawing Sheets

METHOD OF INPUT SELECTION IN AN ELECTRONIC GAME SYSTEM

FIELD OF THE INVENTION

This invention generally relates to interactive methods for user input selection in an electronic game system, particularly to methods for effecting selection from among one or more multimedia game play options, and more particularly for effecting such selection in an immersive virtual reality electronic game system which utilizes head mounted display means.

BACKGROUND OF THE INVENTION

User input selection in electronic game systems (such as arcade games, computer games and video games) involves making startup decisions, such as which of the available games to play, which role to play, which car to use in a racing game, which weapon to use in a fighting game, etc.

User input selection in electronic games has historically involved numerous input devices and software-driven user interfaces. Input devices have included joystick controls and selection buttons, mice, and hand-held controllers. The software-driven user interfaces have primarily involved selections made by moving a selection point or area two-dimensionally on a display screen and by pushing the appropriate button when the desired selection is indicated.

Most prior art methods of menu selection in traditional electronic games can also be employed in a multimedia or immersive virtual reality electronic gaming system. However, such gaming systems make available unique forms of user experience and interaction. Multimedia systems, on the one hand, employ additional communicative and interactive media, and immersive virtual reality systems, on the other hand, put the user in the situation wherein he or she sees the game's display three-dimensionally, from the point of view of being within, and being free to move about in, a virtual world.

Accordingly, it is an object of the present invention to provide methods for selecting among game playing options which take advantage of the new forms of presentation and user interaction in multimedia and immersive virtual reality game systems.

SUMMARY OF THE INVENTION

The present invention primarily addresses types of selections in a game program or system that can be represented by animated sequences. The type of selection involved can be to select one game from an available selection of games, although other objects of selection (episodes, saved games, characters, weapons, roles, etc.) could equally well be represented by an animated sequence.

The method of the present invention utilizes the metaphor of portals suspended before the user, each depicting an animated scene, which the user may select and appear to pass through in the process of making the desired selection. Where more selections are available than can be displayed at one time, means are provided to change the current range of selections being displayed. One of the displayed portals is designated at any time as the one that will be chosen when the user activates the input means for making a selection. (The portal so designated may be at a fixed or selectable location, depending on the particular implementation.)

Selection choices and changes can be made by manual activation of controls, or since an immersive system involves head tracking, by means of head motion. Preferably, there are audible prompts and feedback as well. Such selection means can be repeated and nested in order to present input choices as necessary for proper initiation and operation of the game.

DETAILED DESCRIPTION OF THE PREFERRED EMBODIMENTS

Figure 1:
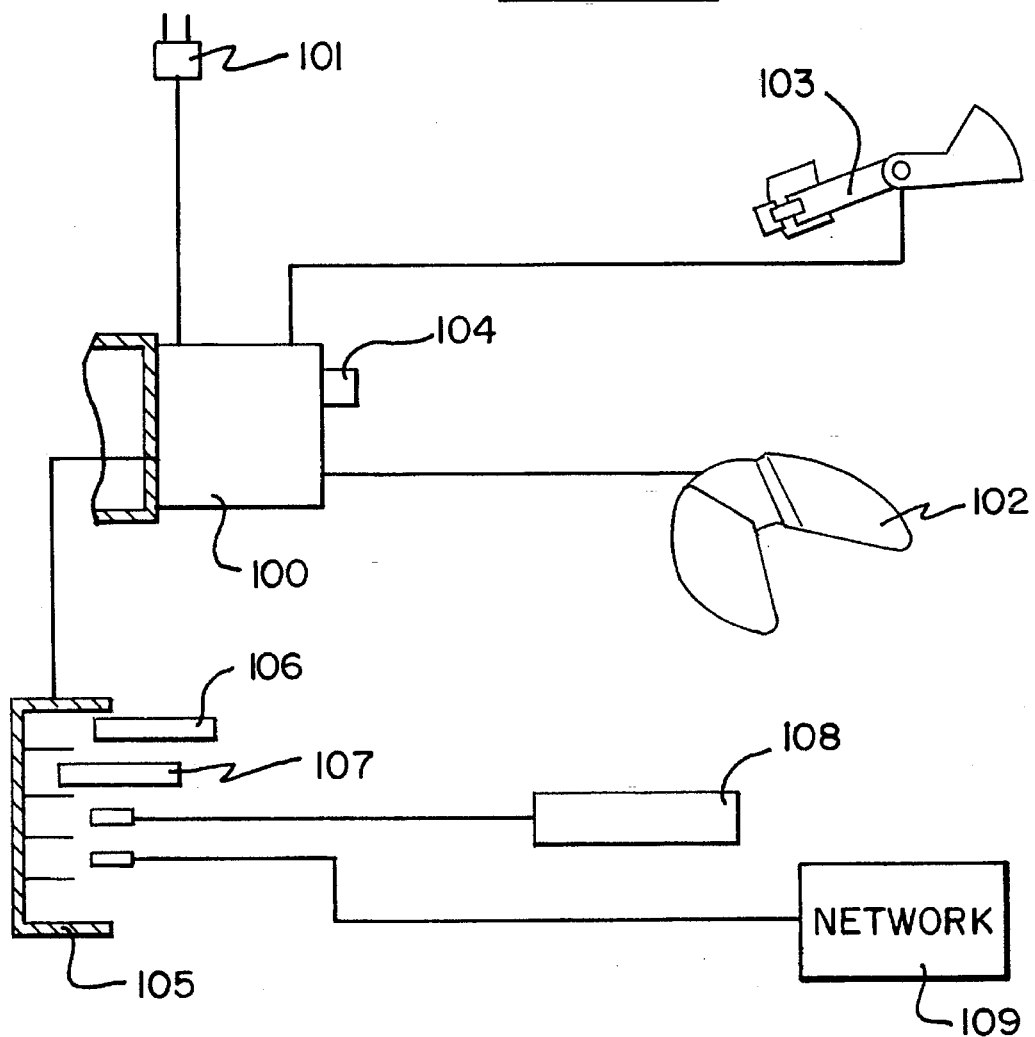
FIG. 1 is an illustration of the various hardware components used in a typical immersive virtual reality gaming system within which this invention is implemented.

FIG. 1 depicts the various hardware components used in a typical immersive virtual reality gaming system within which this invention is implemented. These components are a game console 100, its AC adapter 101 which provides the system's power, a hand-held controller 102, a head mounted display 103 and a game cartridge 104. Optional peripherals include a "jukebox" 105 in which a plurality of game cartridges 106, 107 or other programmatic sources, such as coin pact disc player 108 or a network connection 109 (to a shared program source or to other game systems) may be connected.

Head mounted display (HMD) 103 provides a video display means, such as one or two color liquid crystal display panels, and optics for viewing the display. HMD 103 is worn by the user in a manner similar to a pair of ski goggles (but it is not transparent). HMD 103 employs head tracking means, such as one or more magnetometers, one or more clinometers and/or gyroscopic sensors, which detects head movement. Head tracking may be used in conjunction with hand controls to effect changes in the point of view by translating the point of view forward, backward or sideways, up or down, or by changing the direction of the view in relation to any of three axes. As this is done, the contents of the display are scrolled and/or rotated so as to provide the illusion of the user's own movement within a realistic three dimensional "virtual world."

Mounted in HMD 103 are sound transducers arranged so as to create the sensation of realistic sound coming from various sources in three dimensions.

Console 100 contains a high speed processor with graphical processing elements capable of generating a high resolution three dimensional display with animation and processing responses to head motion (and corresponding changes in viewpoint), all in real time.

Figure 2:
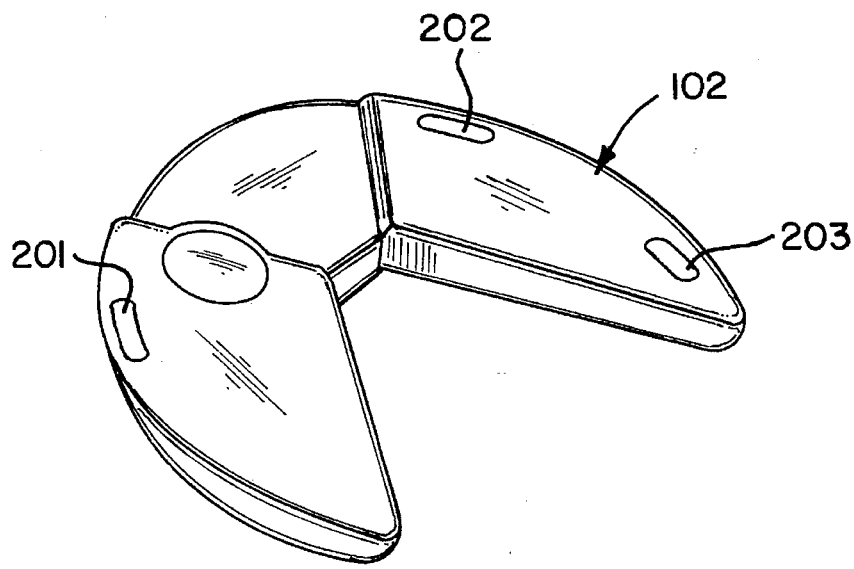
FIG. 2 depicts a hand-held controller and its various surface switches and components.

FIG. 2 depicts hand-held controller 102 and its various surface switches and components. Most significant for purposes of this disclosure are user selectable toggles, including a left forefinger button 201, a right forefinger button 202, and a right thumb heel button 203.

Figure 4A:
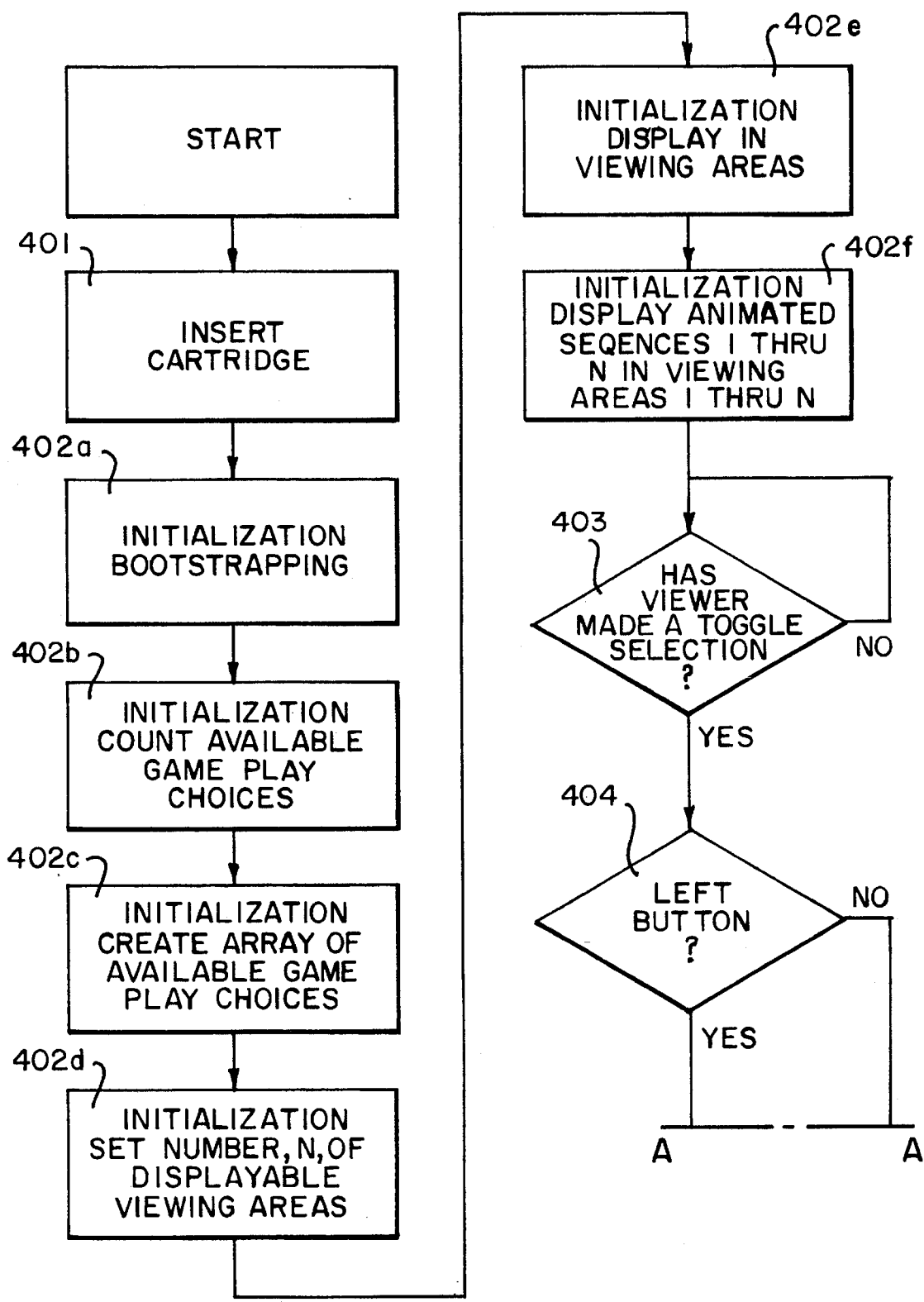
FIGS. 4A and 4B are a flow chart illustrating the method of the present invention.

Prior to operation of the game system, a user inserts (step 401 in FIG. 4A) the desired game cartridge 104 into console 100, or activates an interface unit called a "jukebox" 105 in which there is in turn inserted the media or connection links for the desired programmatic sources. For purposes of illustration it is assumed that there are five available programs, but there may be as few as one or many more than five. A game called the "Silver Bullet" is implemented in firmware embedded in console 100, and is always an available program choice.

In the preferred embodiment of the present invention, the game system, which is an immersive virtual reality system, allows the user to select a TIME, PLACE and SITUATION, or TPS coordinate set, and the game system will (in the virtual world) transport the user's consciousnesses to the selected destination. Most TPS coordinates have a "Buddy," which may be either a full fledged character or merely a voice, to help the user get acquainted with the new location. A TPS may correspond to an entire game, or it may correspond to particular TPS coordinates within a game.

Figure 3:
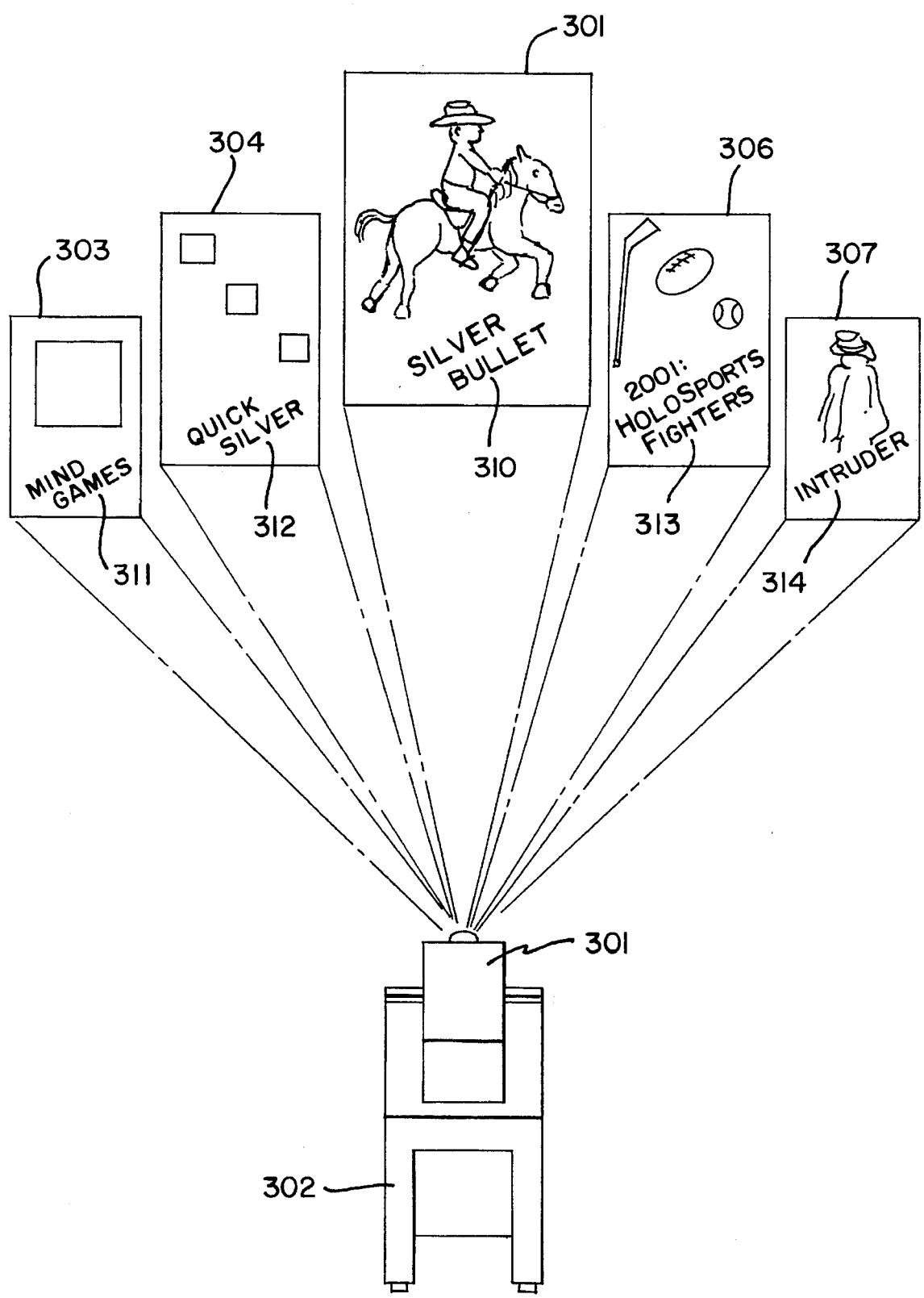
FIG. 3 is a two-dimensional static representation of a typical portal display generated by the preferred embodiment of the invention.

After some initialization actions associated with system bootstrapping (step 402a) and initial game and display setups (steps 402b–402f), there will be displayed within HMD 103 a scene similar to that depicted in FIG. 3. In this scene, the user will see a projector 301 on a podium 302 which will be projecting picture frames, comprising five to ten frames of animated, low resolution art 303–307 representing the available TPS coordinate selections. Center frame 305 is the largest, and it is the selection that will be chosen upon pressing right thumb heel button 203 on hand-held controller 102. The center frame is also known as the target selection. By default, Silver Bullet game 310 appears in frame 305 upon startup. Each successive frame moving away from the center frame, 304, 303, etc., is displayed successively smaller so as to appear more distant. Preferably, the entire scene so depicted is presented three dimensionally from the viewpoint of the user standing (or moving about) within the scene, the frames so presented appearing as portals suspended in front of the projector. In addition, the animated scenes depicted within each portal are also represented three dimensionally, so as to give the impression of three dimensional spaces on the far side of each portal.

Figure 4B:
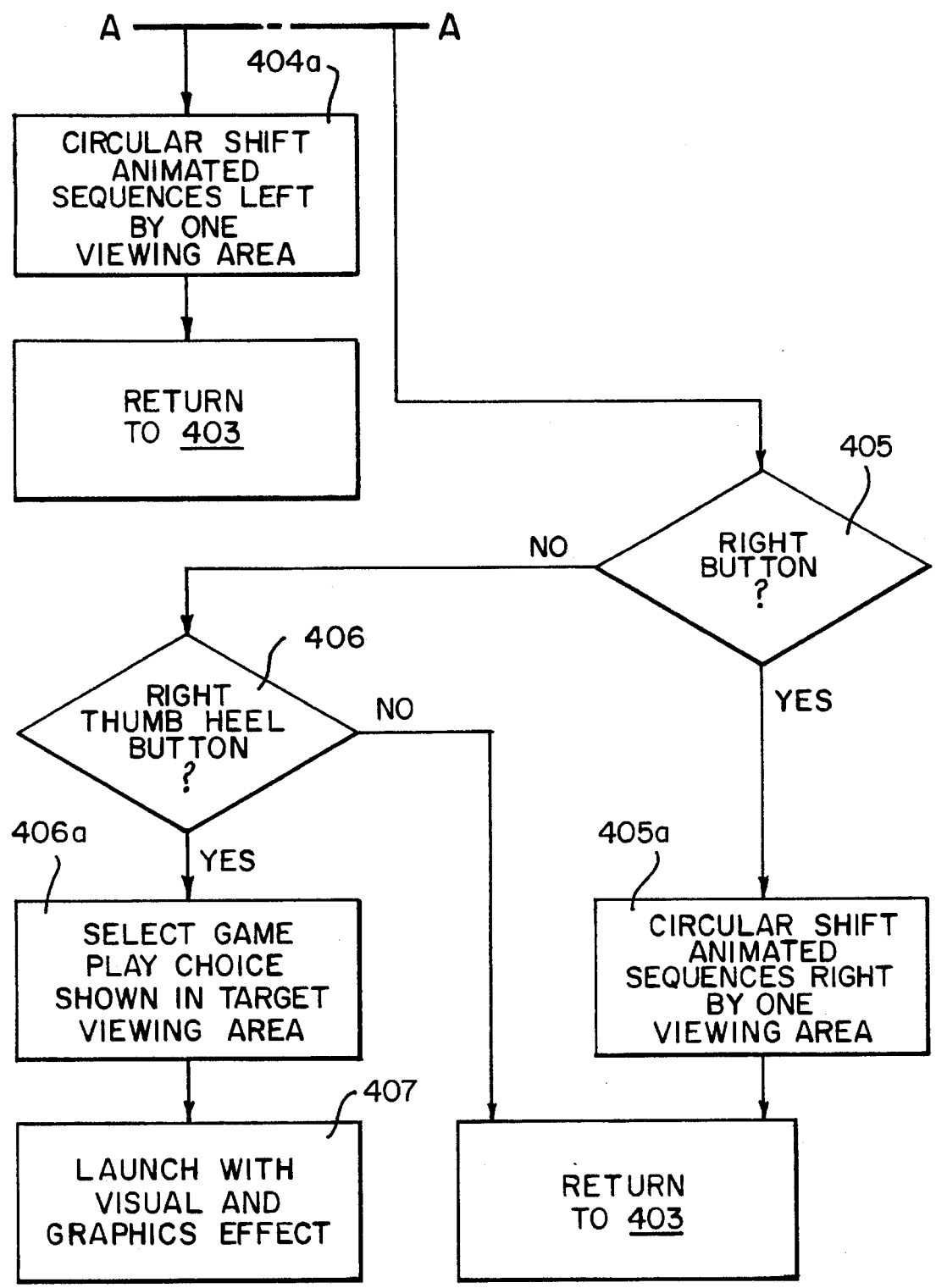

The user can select (step 403) between four other TPS coordinates (games), called here "Mind Games" 311, "Quicksilver" 312, "2001:HoloSports Fighters" 313 and "Intruder" 314, by using the two forefinger buttons, 201 and 202, with left button 201 rotating virtual frames to the left (step 404), and right button 202 rotating virtual frames to the fight (step 405). The TPS occupying the center frame 305 is the largest. Pressing right thumb heel button 203 selects this TPS (step 406 in FIG. 4B). If there are more TPSs to display than there are available display frames, shifting the selection by one increment (steps 404 or 405) causes one new TPS to be brought into view and one previously displayed TPS to go out of view (for example, by means of a circular buffer). In the preferred embodiment, this is done in the same circular shifting manner (steps 404a, 405a) that is applicable when all of the available TPS selections fit within the available frames.

In an alternate embodiment of the present invention, there is a means for highlighting one of the frames in the user's view. In such alternate embodiment, the frame to be selected upon making a selection choice will be the frame that is so highlighted. Such a scheme could be implemented, for example, with a "virtual spotlight" as opposed to a virtual projector. Suitable mechanisms could be provided for scrolling or switching new frames into view on demand to expand the range of available options beyond what can be shown on the screen at any given time.

Since TPSs may correspond to TPS coordinates within a game, the method of the present invention may be nested to any desired level to control detailed aspects of game play, in addition to game selection. In addition, the same method may be employed to make selections among choices not involving time, position or situation differences, for example, whether to play a one or two player game or whether or not to empower virtual opponents within the game with artificial intelligence.

The method of this invention may be embelished for dramatic effect within a given game or scenario. Thus, selecting a game could cause a visual and graphic effect (step 407), in which the selected frame zooms up to fill the screen as the game unit audio informs that it is transporting the user to the time, place and situation coordinates of the selected game, all suitably animated from the user's viewpoint and described, with accompanying sound track. Thus, upon making a selection, the user is made to feel that he or she is being sucked up and swept into the selected game. The selected frame becomes a portal through which the user passes on his or her way into the chosen virtual world.

The present invention has utility with any electronic gaming system now known or hereafter developed that includes a visual display and user input means and has animation capability. The embodiments described above clearly realize the stated object of the invention, yet are not intended as an exhaustive compilation of the invention's content of patentable novelty. Numerous further variants will be obvious and may be effected by anyone skilled in the art without departing from the scope or spirit of the invention.

I claim:

1. In an electronic game system comprising a game console, a visual display, means for inputting a command to change a selection and means for inputting a command to make a selection, a method of effecting a user selection from among one or more game play choices, comprising:

displaying in one or more viewing areas of said visual display animated sequences each corresponding to one of said game play choices;

designating one of said viewing areas as a target viewing area;

upon the user inputting a command to change selections, shifting a different animated sequence into each viewing area, including the target viewing area; and upon the user inputting a command to make a selection, initiating said game play choice corresponding to said animated sequence then in said target viewing area.

2. The method of claim 1, wherein said visual display is a head mounted display.

3. The method of claim 2, further comprising the step of presenting an image on said visual display that appears three dimensional to the user.

4. The method of claim 3, wherein the step of displaying includes presenting said animated sequences as images that appear three dimensional to the user.

5. The method of claim 1, wherein initiating said selected game play choice causes said animated sequence corresponding thereto to undergo a transition so as to occupy all or substantially all of said visual display.

6. The method of claim 1, wherein said animated sequences are depicted so as to appear to emanate from a projector centrally positioned in said visual display.

7. The method of claim 1, wherein said shifting of animated sequences further comprises:

assigning said animated sequences and said corresponding game play choices into a circular series;

designating said one or more viewing areas as an ordered sequence;

rotating said circular series in one direction or the other with respect to said ordered sequence of viewing areas, whereby a different animated sequence is displayed in each of said viewing areas after said rotation.

8. In an electronic game system comprising a game console, a visual display, means for inputting a command to change a selection, means for inputting a command to display a new set of selections and means for inputting a command to make a selection, a method of effecting a user selection from among one or more game play choices, comprising:

displaying in one or more viewing areas of said visual display animated sequences each corresponding to one of said game play choices;

designating one of said viewing areas by default as a target viewing area;

upon said user inputting a command to change said target viewing area, shifting the designation of the target viewing area in accordance with said command;

upon the user inputting a command to display a new set of selections, replacing the displayed animated sequences with such other sequences that correspond to available game play choices which were not previously shown in said display; and upon the user inputting a command to make a selection, initiating the game play choice corresponding to the animated sequence then in said target viewing area.

9. The method of claim 8, wherein the visual display is a head mounted display.

10. The method of claim 9, further comprising the step of presenting an image on said visual display that appears three dimensional to the user.

11. The method of claim 10, wherein the step of displaying includes presenting said animated sequences as images that appear three dimensional to the user.

12. The method of claim 8, wherein initiating said selected game play choice causes said animated sequence corresponding thereto to undergo a transition so as to occupy all or substantially all of said visual display.

13. The method of claim 8, wherein the step of inputting a command to change said target viewing area includes selecting said target viewing area with a simulated pointing means aimable by the user.

* * * * *